United States Patent [19]

Isaka et al.

[11] Patent Number: 4,963,418
[45] Date of Patent: Oct. 16, 1990

[54] THERMO-SHRINKABLE POLYESTER TYPE FILM AND TUBE AND PROCESSING METHOD FOR PREPARING THE TUBE

[75] Inventors: Tsutomu Isaka; Toshihiro Yamashita, both of Inuyama, Japan

[73] Assignee: Toyo Boseki Kabushiki Kaisha, Osaka, Japan

[21] Appl. No.: 301,827

[22] Filed: Jan. 26, 1989

Related U.S. Application Data

[63] Continuation-in-part of Ser. No. 890,368, Jul. 29, 1986, abandoned.

[30] Foreign Application Priority Data

| Jul. 31, 1985 | [JP] | Japan | 60-170135 |
| Aug. 2, 1985 | [JP] | Japan | 60-171476 |
| Oct. 18, 1985 | [JP] | Japan | 60-233958 |
| Oct. 18, 1985 | [JP] | Japan | 60-233959 |

[51] Int. Cl.$^5$ .................... F16L 11/00; C08G 63/00; B29C 53/00
[52] U.S. Cl. .................... 428/34.9; 156/218; 264/289.6; 264/290.2; 428/910; 528/304; 528/308; 528/308.2
[58] Field of Search .................. 528/304, 308, 308.1, 528/308.2, 308.3, 271; 428/34.9, 480, 410; 264/289.6, 290.2; 156/218

[56] References Cited

U.S. PATENT DOCUMENTS

| 3,551,540 | 12/1970 | Pellicciari et al. | 264/289.6 |
| 4,059,667 | 11/1977 | Pangonis | 528/271 |
| 4,060,959 | 12/1977 | Fiedler et al. | 53/373 |
| 4,410,011 | 10/1983 | Andrä et al. | 428/348 |
| 4,421,104 | 12/1983 | Adcock | 126/424 |
| 4,477,653 | 10/1984 | Hegemann et al. | 528/304 |
| 4,546,030 | 10/1985 | Minami et al. | 428/220 |

FOREIGN PATENT DOCUMENTS

1187742 2/1965 Fed. Rep. of Germany .

*Primary Examiner*—James Seidleck
*Attorney, Agent, or Firm*—Wegner & Bretschneider

[57] ABSTRACT

A thermo-shrinkable polyester type film having the following shrinking properties:
  a shrinking ratio in one axis is not less than 30% at 80° C. and not less than 50% at 100° C., and
  a shrinking ratio in a perpendicular axis to the former axis shows the minimum value at a temperature range of 80°±25° C., and the process therefor.
This film shows an excellent shrinking properties for packaging.

14 Claims, No Drawings

THERMO-SHRINKABLE POLYESTER TYPE FILM AND TUBE AND PROCESSING METHOD FOR PREPARING THE TUBE

This application is a continuation-in-part application Ser. No. 890,368 filed July 29, 1986, now abandoned.

FIELD OF THE INVENTION

The present invention relates to a thermo-shrinkable polyester type film (the term "film" hereinafter used includes sheet) which shows an especially preferable properties in the field of packaging material such as for covering or parcelling, and tubes obtained from the said polyester type film, and a processing method for preparing the tube from the said polyester type film.

BACKGROUND OF THE INVENTION

Tubular materials formed from a thermo-shrinkable plastic film as a starting material have been generally used for covering or parcelling of, for example, vessels, bottles (including plastic bottles), tubes, cylindrical material (pipes, rods, lumber, and other cylindrical material of various kinds), especially for partially or integrally covering of the caps, shoulder, bulge etc. of the above material for the purpose of labelling, protecting, integrating, improving their commercial value and so on, and they also have been used in the various fields, for example, for packaging, such as parcelling packaging of boxes, bottles, plates, notes etc. or skin-packaging wherein the film is adhered onto the unpacked material. Therefore, other usage utilizing their shrinking properties and shrinking stress is expected to be developed.

In the above applications, a thermo-shrinkable film such as polyvinyl chloride, polystyrene, polyethylene, rubber hydrochloride or the like is conventionally used, which is previously formed into a tube, then put on the said bottles and the like, or integrally packed, and subjected to thermo-shrinkage.

OBJECT OF THE INVENTION

However, these conventional technique involves many defects as follows:

Firstly, the problems on the thermo-shrinkable film such as polyvinyl chloride used for the above purpose are discussed.

(a) almost incomplete uniaxial shrinking properties

Desirably, such materials should shrink mainly along one axis without shrinking in its cross direction. For example, in the process of labelling the bottle by shrinking the tube, the film also shrinks in lengthwise, the label will not be placed in the right position but placed at above the desired position upon shrinkage and results in spoiling the appearance. In order to prevent the defect, longitudinal shrinking ratio must be minimized. However, the transversely oriented film to meet this purpose is, as easily understandable in the field of polymer chemistry, easily torn off and easily fibrillated resulting in reduced strength. Especially, when the bottle is dropped, the longitudinal strength is considered to be important to prevent cracking of the bottle. Therefore, the simple uniaxial orientation can not be a good method. Also, in many other applications, the film can not be used without impact- resistance.

From such viewpoint, the film which is less shrinkable in a certain temperature range, while it is sufficiently shrinkable in the cross direction, has been required.

(b) insufficient heat-resistance

All of the said conventional films can not resist to the boiling or retort process at a high temperature, therefore they are not suitable for sterilizing process. For example, in the retort process, the said conventional film must be broken, torn off, and lost all function during the process. Therefore, thermo-shrinkable film which can resist to the boiling or retort process is required to be provided.

(c) bad printability

The above conventional films suffer from their intrinsic defects of generating pin-holes upon half-tone printing, adhesion to various kinds of ink and the like. For example, in polyvinyl chloride film, ink-pin holes can be easily generated owing to gel material, and in the continuous tube processing, many pin holes exist in the long film. When such film is fed to the automatic labelling machine, it is processed with such holes remained thereon. Therefore, all products should be examined, requiring labor and re-processing which results in significantly lowered efficiency. In order to eliminate pinholes in the step after completion of printing, the film should be cut and then bonded with adhesive tape to be a continuous film. Thus, the products inevitably have seams, which results in producing bad products, and the such poorly packed products must be removed during the process. Moreover, in very accurate printing, the printing pitch is reduced (with times) owing to shrinkage of the film after printing and further the pitch continuously changes at the temperature under usual distribution condition, therefore the maintenance of the product turns out to be quite difficult. Thus, the shrinkable polyvinyl chloride film and the like requires refrigerators or ware house at low temperature. Therefore, thermo-shrinkable film which can provide printing without pin-holes, and free from change with time after printing, is required.

(d) generation of craze

Polystyrene easily crazes and shows poor resistance to chemicals. Therefore, it is easily destroyed by agent and the printed surface is also stained upon usage. Therefore, the film with excellent resistance to chemicals is required.

(e) problems on the industrial waste

Recently, the consumption of plastic bottles are remarkably increasing. For the recycle of the bottles, especially when the polyester bottles are covered with different kinds of film such as polyvinyl chloride, polystyrene or the like, the bottle can not be reused.

Also, the vinyl chloride is accompanied with the problem of corrosion by the chlorine gas produced therefrom, therefore thermo-shrinkable film without producing such pollution is required.

(f) deviated shrinkage

Thermo-shrinkability of the above conventional film has poor uniformity. Once it is heat-set, separately forming both well-shrunk portions and poorly-shrunk portions, no further re-shrinking does not occur upon re-heating. Therefore, the product has unhomogeneous and rough surface. Thermo-shrinkable film free from deviated shrinkage is required.

The primary object of the present invention is to provide polyester type film which can overcome the drawbacks described in (a)–(f).

When tubes are produced by using thermo-shrinkable film such as polyvinyl chloride and polystyrene, the film is usually bonded by applying solvent onto the said film, and sometimes ultrasonic seal technique may be employed. When polyethylene is used as a starting material, heat-seal or impulse-seal is also employed. On the other hand, as for polyester-type tube, only ultrasonic seal is taken up studying. The drawbacks about tubes produced from such thermo-shrinkable film are as follows:

(b-1) insufficient heat-resistance

Polyester type film, exemplified by polyethylene terephthalate film, is expected to be ideal because of having heat-resistance. However, the tube having excellent heat-resistance at its joint has not yet been developed.

For example, polyethylene terephthalate can be managed to be sealed by ultrasonic seal. However, the ultrasonic sealed portion become brittle owing to heat-deterioration and crystallization after boiling or retort process, and when it is used for packaging of vessels, it is fractured by shock at the said sealed portion.

(g) fracture of the label of vessels

According to the said heat-seal and ultrasonic seal, the product is fractured at the sealed portions upon, for example, dropping-impact of the vessels, which results in entire fracture of the film, and it shows poor protective properties.

(h) Getting hazy

When the oriented film is bonded at high temperature, it may be decreased a molecular orientation and further gets hazy upon after-processing such as heat-sterilization.

(i) Processing rate and adhesion strength at joint

In the processing of polyester-type polymer into tube, ultrasonic process has been put to practical use, and bonding with adhesives has also been studied.

However, with ultrasonic seal the bonding should be performed at quite low rate in order to obtain sufficient sealing strength, resulting in low productivity and high cost for processing tube. And the ultrasonic sealing is easily effected by controlling of gap between horn tips, resulting in embitterment and failure of the product with variable bonding strength, and deforming and damaging of the base material.

Bonding with adhesive seems to be reasonable, however, different to the bonding by laminating or coating, it suffers from defect that the joint is easily peeled off due to repulsion arising from elastic property of the film which is folded and then bonded. In order to prevent above problem, adhesive which can rapidly provide high tackiness should be used, which results in low efficiency of coating process. Even when the film is managed to be bonded, the adhesive should be softened in the following heat-sterilization process so that the films slipped off at joint due to the shrinkage, providing notched seam with overflow of adhesive. Therefore, the joint shows appearance different from that of original film which spoils the commercial value of the product.

The second and third objects of the present invention are to provide a thermo-shrinkable polyester type tube which can overcome above-mentioned problems (b-1), (g)–(i) by using thermo-shrinkable film free from the above problems (a)–(f), and to provide a process for preparing thereof.

That is, the present invention provides a polyester type tube and a process for preparing the tube from thermo-shrinkable film having especially preferable properties in the field of packaging material for covering or parcelling, and the said tube have joint showing almost the same thermo-shrinkable properties as those of the base material and free from deformation upon heating.

SUMMARY OF THE INVENTION

The present invention provides a thermo-shrinkable polyester type film having following shrink properties:

a shrink ratio in the first axis is not less than 30% at 80° C. and not less than 50% at 100° C., and a shrink ratio in perpendicular axis to the first axis is not more than 15%, the minimum value at a temperature in the range of 55°–105° C.

The present invention also provides a tube of a thermo-shrinkable polyester type film which has a joint surface thereof being jointed by at least one solvent or swelling agent having a solubility or swelling ability to a polyester and a solubility parameter of 8.0–13.8, and following shrink properties:

a peripheral shrink ratio is not less than 30% at 80° C. and not less than 50% at 100° C., and a longitudinal shrink ratio is not more than 15%, the minimum value at a temperature in the range of 55°–105° C.

The present invention further provides a process for production of tube from polyester type film
which comprises:
spreading at least one joint surface of the film with the above solvent or a swelling agent, and
jointing the surfaces to be jointed to give a tubular film before the solvent or swelling agent is dried, or
which comprises:
disposing an adhesive layer on entire or part of at least one joint surface
spreading at least one surface with the above solvent or a swelling agent, and
jointing the surface to be jointed to give a tubular film before the solvent or swelling agent is dried.

DETAILED DESCRIPTION OF THE INVENTION

According to the present invention, thermal shrinkage, which is one of the basic properties of the present film, should be not less than 30% at 80° C. in the first axis. When it is less than 30% at 80° C., the required shrinkage can not be attained during subjecting the film to thermo-shrinkage against a profile shape to be packed, therefore the film must be heated up to considerably high temperature. Then, the application of the film is restricted because of heat-resistance of the packed material. For example, where the said packed material itself is made from thermoplastic material, it should be deformed, melted or deteriorated upon heating. Considering such cases, it is preferably that the film shows thermal shrinkage of not less than 40% at 80° C. On the other hand, the ratio should be not more than 90%.

Further, the film is required to have thermal shrinkage of not less than 50% at 100° C. When the film has a thermal shrinkage of less than 50%, it induces a high risk of generating uneven shrinkage. However, it is not preferable that the ratio is over 95%.

When the film has higher thermal shrinkage at 80° C. than that of at 100° C., it is not preferable that, on increasing the temperature from 80° C. to 100° C., the film once shrink at about 80° C., then become loose upon continuous heating, and hence, the film loses the tightness which has been attained by shrinking stress.

Generally, thermal shrinkage in the cross axis to the said first shrinking axis should be not more than 15%. Especially, it should be minimal at the temperature in the range of 55°–105° C. Under such conditions, the film shrinks mainly in the first axis, providing excellent appearance of covering. In the said temperature range, the film shrinks mainly in the first axis so that it adheres closely onto the material to be packed. And the friction arising from the adhesion will prevent further shrinkage and provide excellent covering with strong parcelling force.

The film shrinks in the said main axis especially in this temperature range to be closely contacted to the packed material. Then, further shrinkage should hardly occurred at the temperature higher than 55°–105° C. owing to friction and restraint force arising from contact to the packed material. Therefore, it is significant to restrain shrinkage in other axis in the temperature range where remarkably great shrinkage might be generated.

The changes in printing pitch during processing after printing are minimized by using polyester type copolymer having glass transition temperature not less than 35° C. and a mixture thereof. Especially, a polyester type copolymer having a glass transition temperature of not lower than 45° C. and a mixture thereof are preferably used in summer or in hot area.

In order to acquire the above properties, it may be desirable to select a copolymer or the mixture thereof mainly including an ester group composed of a dicarboxylic residue and a glycol residue and containing 30–90 mol % of one kind of a aromatic dicarboxylic residue based on the whole dicarboxylic residue. Examples of such polyester include polyester copolymers produced by using more than one dibasic acid selected from terephthalic acid, isophthalic acid, adipic acid, orthophthalic acid, sebacic acid, naphthalene dicarboxylic acid and the like, and more than one diol selected from ethylene glycol, butane diol, neopentyl glycol, cyclohexane dimethanol and the like. More specifically, polyethylene terephthalate, polybutylene terephthalate, polycyclohexane dimethylene terephthalate, polyethylene $\alpha,\beta$-bis(2-chloro or 2-methoxyphenoxy)ethane-4,4'-dicarboxylate, polyethylene(tere/iso)phthalate, polyethylene (tere/iso/ortho)phthalate or a mixture thereof, can be used but not limited to the above examples.

These polyester can be admixed with polyester/polyether block copolymer in the amount not detrimental to transparency of the polyester. A base material for a film preferably has an intrinsic viscosity of 0.50–1.3 dl/g. As far as the polymer has an intrinsic viscosity within the said range, the polymer having lower molecular weight or higher molecular weight may be also mixed in an amount of not less than 70 wt %. The film obtained by using such polymer according to an appropriate method, for example, extrusion, calender or the like is stretched 2.5–7 times, preferably 3.0–6.0 times in the one axis, and further stretched not more than 1.0–2.0 times preferably 1.1–1.8 times in the perpendicular axis to the former axis. The stretching in the one axis is performed to obtain high thermal shrinkage. On the other hand, the stretching in the perpendicular axis above mentioned is quite useful to overcome defects such as bad to impact resistance or tear resistance.

However, stretching of more than 2.0 times results in excessively high thermal shrinkage in the perpendicular axis to the main shrinkage axis so that a final product suffers from waviness of film edge. In order to prevent such wavy appearance, thermal shrinkage in the perpendicular axis to the main one is not more than 15%, desirably not more than 8–9%, more desirably not more than 7%.

In order to stretch the film, any suitable orientation method may be employed, for example, roll stretching, long-gap stretching, tenter stretching and the like. The film to be stretched may be any shapes of a film such as flat or tubular film.

The stretching may be carried out by employing two or more stepwise biaxial stretching, simultaneously biaxial stretching, uniaxial stretching or a combination thereof. The film of the present invention may be stretched by longitudinal uniaxial stretching, transversal uniaxial stretching, and longitudinal and transversal biaxial stretching, additional stretching after these processes. Especially in biaxial stretching, the stepwise stretching, uniaxial stretching is effective regardless of the order. Simultaneous biaxial stretching may be carried out by the process wherein, for example, the film may be stretched in both directions at once, or the film may be longitudinally or transversely pre-stretched.

Heat-set in these stretching process may be carried out depending on the object. It is desirable to pass the film through a heat zone at 30°–150° C. for about 1–30 seconds to prevent the change in size at high temperature in summer. Alternatively, the film may be tighten up to 70 % in one or both axes before or after such process. Especially, the film is preferably tightened in main (first) axis and released in unshrinkable axis (perpendicular to the main shrinkable axis), or not stretched in the latter axis.

In order to obtain more preferable properties of the film of the present invention, in addition to effect stretching in the above draw ratio, it is also effectively pre-heated to the temperature not lower than average glass transition temperature (Tg) of the polymer composition such as Tg+80° C. and stretched. The above temperature of treatment during stretching in main axis (main shrinkable axis) is particularly significant in order to decrease a thermal shrinkage of the perpendicular axis to the main one and set the minimal value thereof within the range of 80°±25° C. Then, after stretching, the film is cooled under tightening or tension with stress, or further cooled to give a good and stable shrinking property. Although there is no special limitation for the thickness of the film of the present invention, it is advantageously for a practical application in the range of 1–600 μm.

However, in order to meet the current commercial requirement, the thickness is more preferably up to 4–380 μm. In the aforementioned applications, it should be practically in the range from 6–250 μm. Thus obtained film preferably has a surface orientation factor of not more than $100\times10^{-3}$. With surface orientation factor over $100\times10^{-3}$, the film may be readily fractured upon slight impact.

Birefringence of the film is preferably $15\times10^{-3}-160\times10^{-3}$. If it is less than $15\times10^{-3}$, longitudinal thermal shrinkage ratio and shrinking stress is insufficient, on the other hand, if it is over $160 \times 10^{-3}$, the resistance to scratching and impact may be reduced, which results in, at most, providing a film with practically less value.

The film of the present invention is hereinafter illustrated in connection of its applications:

In packaging, especially for foods, beverage, medicine and the like, shelf life is prolonged by boiling process, retort process, sterilized packaging and the like. However, the currently used thermo-shrinkable film can not be sufficiently resistant to such treatments. On the other hand, the film of the present invention can be sufficiently resistant to heat-sterilization by boiling or retort process and provide a good appearance of the film itself as well as thermo-shrunk product. Further it has higher thermo-shrinking stress and better binding properties compared with PVC.

Therefore, the film of the present invention can be used for providing stable cover or binding packaging resistant to crumbling for heavy and deformable materials. Since the present film has minimal thermal shrinkage in the perpendicular axis to the main shrinking axis at the thermal shrinkage of 50-70% which is required for packaging, the film is subjected to thermo-shrinking in the above temperature range wherein the shrinkage in the latter axis is minimal (80°±25° C.) in the process from the initial thermo-shrinkage to final shrinking packaging process, which results in minimal error in dimension of the final product.

In the packaging utilizing thermo-shrinking properties, generally, the film is continuously heated after thermo-shrinkage is completed (when the film is closely contacted to the packed material, whereby it can not shrink any more even if it can afford to). The above process will be important to attain even and complete shrinkage for various product with different shapes. In such cases, if the film can not shrink any more, it may rather linearly expand upon heating, resulting in drawback, that is the once shrunk film is expanded to become loose. According to the present invention, it is desirable to enhance shrinking stress and, as described above, further elongate the film after stretching in order to prevent such defects. The orientation in the present invention is significant in this viewpoint.

The properties are further illustrate as follows:

(a) uniaxial shrinkable property:

One object of the shrinkable film is to prevent breakage or crumbling of the packed material. In order to attain such object, the film should have high resistance to impact and high shrinking ratio in the main axis. The film of the present invention with high shrinking ratio and high resistance to impact has been found to provide a good packaging and show excellent durability in connection of protection of the packed material. This property is demonstrated by the drop test. Moreover, nearly complete uniaxial shrinkage affords minimized error in size of the finished product after shrinking packaging. That is, the present film has low thermal shrinkage in the perpendicular axis to the main one, and when it is formed into, for example, tube, the resulting tube is excellent with little error in longitudinal dimension.

(b) heat-resistance:

Conventionally used films can not be resistant to boiling or retort process at high temperature, therefore they are not suitable for sterilization process. For example, when subjected to resort process, the said conventional films are fractured, torn off and lose all functions during the process. Contrary to them, the film of the present invention can be subjected to heat-processes such as boiling and retort treatment, and has excellent usefulness as a thermo-shrinkable film.

(c) printability:

The conventional films suffers from inherent defects in connection with generating of pinholes by half-tone printing, adhesion to various kinds of inks and the like. For example, using polyvinyl chloride film, many ink pinholes are generated by gel material, and when the film is continuously processed, the existing pinholes on the film should be eliminated by inspection. Such quality inspection requires additional labor and significantly reduces the efficiency of the process. Further, after removing the portions having pinholes thereon, the film should be adhered with adhesive tapes, resulting in thickened overlapped portion. For webbing of the continuous lengths, such overlapped portion is deteriorate and further the said thickened portion may cause deformation of the film.

Further, the conventional films generally suffers from shrinkage with time after printing upon seasonal change of temperature, especially during storage for a long period, therefore refrigerator or warehouse at low temperature must be used. On the other hand, the present invention can relax such limitation.

(d) craze:

According to the present invention, craze of the film during or after thermo-shrinkage does not occur. Particularly, craze is not produced after boiling or retort treatment.

(e) industrial waste:

Recently, plastic bottles as well as glass bottles have been rapidly generalized. Considering recycle of such bottles, the films and the bottles are preferably made from the same kind of material. Therefore, the present film can be advantageously used for packaging bottles made from polyester type polymer.

Moreover, the film of the present invention does not emit toxic gas such as chlorine gas upon thermo-shrinkage. Recently, various properties of thermo-shrinkable film such as convenience packaging, integration property, adhesion and the like attract attention and such film is generally used for automatic, economized packaging. Emitting no toxic gas is also an important matter from this point of view.

(f) deviated shrinkage:

The film of the present invention has high shrinking ratio and high shrinking stress. Therefore, it can shrink upon re-heating so long as it is carried out continuously, and does not show any deviated shrinkage. In the process for preparing polyester type tube using the above thermo-shrinkable film, probably ultrasonic seal and bonding with adhesives can be employed. According to such conventional methods, however, the product is processed at low speed producing widely varying products. Moreover, the seam causes breaking of the entire product, and the seam and the base material show different shrinkage upon thermo-shrinking process, producing mottlings or wrinkles after shrinkage. Thus, the above tube involves many defects for practical application as a thermo-shrinkable tube. Further, in such tube after heat-sterilization following to covering upon thermo-shrinkage, the joint may be often peeled off, slip off upon softening, spoiling the appearance of the products.

Thus, in one embodiment of the present invention, the adhesive is used only for base film and, in stead of adhesive, solvent or swelling agent is used to assimilated the seam to other portion to provide an objective thermo-shrinkable polyester type tube.

The solvent or swelling agent used in the present invention has a solubility index of 8.0–13.8. When the solubility index is less than 8.0, adhesion is poor. When the solubility index is greater than 13.8, it effects the form of the base film, and good adhesion is not obtained. In the process for preparing a tube by adhering both edge portion of the film, a solvent or swelling agent having solubility index of 8.0–13.8, for example, aromatic hydrocarbon such as benzene, toluene, xylene, trimethylbenzene; aliphatic hydrocarbon such as methylene chloride, chloroform, ethylene dichloride, 1,1,1-trichloroethane, 1,1,2-trichloroethane, 1,1,2,2-tetrachloroethane, trichloroethylene; halogenated aromatic hydrocarbon such as o-dichlorobenzene; phenols such as phenol, m-cresol; alcohols such as benzyl alcohol; nitrogen compound such as nitro hydrocarbon (e.g. nitrobenzene), nitriles (e.g. acetonitrile), amines (e.g. n-butyl amine, pyridine, morpholine); ketones such as acetone, methyl ethyl ketone, methyl isobutyl ketone, methyl cyclohexane; ethers such as glycol ether (e.g. dioxane), furan (e.g. tetrahydrofuran); esters such as ethyl acetate, n-butyl acetate, monoethyl acetate; organic acids such as formic acid, acetic acid, fluoroacetic acid; inorganic acids, such as sulfuric acid, nitric acid; sulfur derivative such as sulfur dioxide; N,N-dimethyl formamide and the like can be used. Particularly, highly volatile solvents or swelling agents are preferable.

The above examples are only illustrative and the present invention should not be construed to be limited to them. And the said solvents or swelling agents may be used alone or in a combination thereof. The tube formed by using the said solvent or swelling agent (hereinafter referred as solvent) has an overlap width from considerably thin to relatively wide, i.e. over 50 mm, depending on the size of the packed vessels. The standard width is 1–5 mm with the application for generally used bottles. The film may be bonded with one of more seams. Since such joint may hardly spoil the appearance of the base material of the film, the resulting tube retains properties of the original polyester polymer, such as protective properties, for example, resistance to impact or breaking bottles. Moreover, decreasing of orientation upon thermo-shrinkage, or whitening or brittleness are not observed after heat-treatment. Therefore, the present tube meets the basic demands as thermo-shrinkable tube.

That is, in the tube of the present invention, utilizing the above thermo-shrinkable film of the present invention as a base material, the base film portion shows sufficient property (thermo-shrinkability) as described above. Further, the joint shows nearly the same property as base film, for example, it has thermo-shrinking ratio of not less than 80%, preferably not less than 90% based on that of base film. And the present inventors examined the film by adhering by using thermo-set adhesive for dry laminate, which is generally employed to enhance heat-resistance. As a result, thermo-shrinking ratio of seam was reduced owing to the cured layer, showing thermo-shrinkable properties different to those of base film, therefore wrinkles upon thermo-shrinkage were observed. In order to prevent generation of such wrinkles, thermo-shrinking ratio of the joint is desirably not less than 80% of that of base film. For example, when the tube with thermo-shrinking ratio of the bonded portion of less than 80% is put on a products with neck such as a bottle, wrinkles are generated mainly at the neck.

Thermo-shrinkable properties of the tube of the present invention are as described for those of the thermo-shrinkable film of the present invention.

The tube of the present invention may be formed by adhering sides with the said solvent or swelling agent. There is no special limitation for adhesion but the film can be adhered by, for example, (1) simply superposing one side on the another one of the film; (2) applying a tape onto at least one surface of the film to joint the film; (3) butt-seam, wherein resulting sealed portion is bent and adhered onto either surface of the tube.

Thermo-shrinkable polyester tube to meet the desired properties can be also produced according to the process other than above-mentioned one, which is illustrated below. As described above, according to the conventional adhering method, i.e. ultrasonic seal and bonding with adhesives involve defects, that is in the said method, the processing speed is quite low, and the resulting products has widely distributed quality, and further the bonded portion is such that it is easily peeled off, leading to entire destruction of the tube, or it is easily peeled off upon heat-sterilization after covering by thermo-shrinkage and slipped off to spoil the appearance of the product. In another embodiment of the present invention, the polyester film is adhered by using not only adhesive but solvent or swelling agent which can melt and assimilate the said adhesive to solve the said problems. In order to form the polyester film into a tube, adhesive layer is formed on one or both surfaces of the film, and the said adhesive layer can be formed from the said adhesive by any method such as coating or laminating (including co-extruding and laminating by using adhesive film).

The said adhesive can be mixed with hardening agent which can impart enhanced adhesion strength. From the same reason, the said hardening agent can be formulated into solvent to more effectively prevent the slipping at joint upon heating. Conveniently, the hardening agent is mixed into solvent rather than into adhesive to obtain the desired result. There is no particular limitation for the type of the hardening agent to be mixed with the said adhesive. And the amount of the agent is determined depending on the timing of adhesion by solvent. Too much hardening agent results in insufficient dissolution and softening by solvent and the adhesion strength can not be sufficiently enhanced. On the other hand, too moderate curing type of little agent results in softening of the joint upon sterilization at high temperature which cause slipping. The tube which cab be produced without heating during processing and after packaging may do without mixing the hardening agent.

The said solvent and swelling agent must be good solvent or swelling agent for the said adhesives. Further, the solvent which can dissolve the polyester film can give a better result.

Any adhesives which provides good adhesion to polyester film can be used. For example, adhesives which can adhere to the polyester film of the present invention includes polyester type copolymer, acrylic type copolymer, polyisocyanate type (urethane type), epoxy type, synthetic rubber, cyanoacrylate, unsaturated polyester, polyvinyl alcohol, and silicone type adhesive and the like.

As described above, the second method of the present invention can provide the same effect as the first one. According to the present invention, high adhesion strength can be obtained at high speed. The process of the present invention, wherein the film is adhered by using solvent without heating, is free from whitening upon heating, which is often observed with polyester type polymer upon overheating. That is, according to the present invention, the change in properties of the base material can be avoided.

Example

Various properties of the film of the examples are hereinafter illustrated, which were determined according to the following methods:

(1) Haze

Haze was determined according to the method of JIS-K 6714.

(2) Thermal shrinkage

Standard lines were drawn with intervals of 200 mm on the sample films, and the said films were cut into 15 mm wide and their thermal shrinkage was determined at given temperatures. Hot air at 80° C. and 100° C. was used to heat the samples for 1 minutes.

(3) Temperature at which the thermal shrinkage of perpendicular axis to the main shrinking direction shows minimal value Thermal shrinkage of the sample was determined with gradually increasing temperature from 50° C. to 150° C. The resulting data were plotted to determine temperature at which the samples shows minimal thermal shrinkage.

(4) Birefringence and surface orientation factor

Refractive index in three directions, i.e. lengthwise, crosswise and thickness were determined by using the Abbe refractometer. Surface orientation factor is calculated from the formula:

(5) Impact strength

The impact strength was determined by seasoning at 23° C., 65% RH for 24 hours with pendulum type impact testing machine (manufactured by Toyo Seiki KK).

(6) Puncture resistance

Bag (180 mm × 120 mm) was prepared and water (180 ml) was filled therein and sealed. The above bag was dropped from various height and the disruption was observed. The degree of destruction was evaluated based on the following standards:

Sample punctured when it was dropped from lower than 40 cm: Fragile

Sample punctured when it was dropped from the height between 40-75 cm: Bad or Slightly Bad Sample punctured when it was dropped form the height between 75-90 cm: Good Sample punctured when it was dropped form the height higher than 90 cm: Excellent

Example 1 and Reference Examples 1-3

Polyester-type polymer of polyethylene(tere/iso)phthalate copolymer (tere/iso=78/22) was polymerized to give polymer having intrinsic viscosity of 0.80 dl/g, which was admixed with 0.04 (wt) % of silicon dioxide, and melt-extruded to produce unoriented film.

The above film was oriented 1.2 times in lengthwise, then 4.2 times in crosswise. Then the film was cooled under about 20 % of transversal stretching to give thermo-shrinkable polyester film of 40 μm thick, having birefringence of $98 \times 10^{-3}$, surface orientation factor of $31 \times 10^{-3}$, thermo-shrinking ration at 80° C. and 100° C. of 52% and 72%, respectively, wherein transversal direction is main shrinkable axis. The resulting film had minimal longitudinal thermal shrinkage of 4.1% at 87° C. The properties of the above film were compared with those of the typical thermo-shrinkable films which have been conventionally used, and the results are shown in Table 1. In the table, the films of Reference Examples 1, 2 and 3 were polyvinyl chloride film, polyethylene film and polystyrene film, respectively.

TABLE 1

| Properties | Example 1 | Reference Example 1 | Reference Example 2 | Reference Example 3 |
|---|---|---|---|---|
| Haze (%) | 3.2 | 4.8 | 10.3 | 2.8 |
| Thermal shrinkage | | | | |
| longitudinal, at 80° C. (%) | −1.0 | 5.8 | 5.5 | 1.2 |
| transverse, at 80° C. (%) | 52 | 48 | 10.3 | 36 |
| longitudinal, at 100° C. (%) | 3.8 | 6.5 | 23 | 4.5 |
| transverse, at 100° C. (%) | 72 | 59 | 31 | 61 |
| Temperature at which sample shows minimal thermal shrinkage (°C.) | 87 | — | — | — |
| Birefringence | $98 \times 10^{-3}$ | — | — | — |
| Surface Orientation Factor | $31 \times 10^{-3}$ | — | — | — |
| Thermo-shrinking stress | | | | |
| transverse, at 80° C. (kg/mm²) | 1.8 | 0.80 | 0.40 | 0.27 |
| longitudinal, at 100° C. (kg/mm²) | 2.1 | 0.90 | 0.60 | 0.30 |
| Impact Strength (kg-cm) | 19.2 | 4.7 | 21.3 | 3.7 |
| Impact strength after retort process at 125° C. for 30 min | 12.1 | Punctured | Broken | Punctured |
| Resistance to dropping | Good | Slightly Bad | Good | Fragile and Punctured |

$$\text{Surface orientation factor} = \frac{N_x + N_y}{2} - N_z$$

wherein $N_x$ is a lengthwise refractive index of the sample; $N_y$ is a crosswise refractive index of the sample; and $N_z$ is a refractive index toward the thickness of the sample.

The films of Reference Examples did not have the temperature at which the samples show minimal longitudinal thermal shrinkage, and they showed decreasing thermal shrinkage with dropping temperature. On the other hand, the film of the present invention has a certain temperature at which it shows minimal lengthwise thermal shrinkage (in main shrinking axis and in perpendiculat axis thereof), and when it is used for covering, the product with good appearance can be obtained. And each film shown hereinabove was formed in tubular shape having length equal to the height of the plastic bottle to be packed, and the film was put on the bottle and shrunk at 87° C. As a result, the film of the present invention showed least change in its height and also exhibited homogeneous appearance, while the films of Reference Examples showed unhomogeneous appearance. When the films were subjected retort process, in the films of the Reference Examples, puncture and local explosion, as well as considerable shrinkage and melting were observed.

Example 2 and Reference Examples 4 and 5

Polyethylene (tere/iso)phthalate copolymer containing 80 mol % of terephthalic residue (90 wt %) and polyethylene (tere/iso)phthalate copolymer containing 60 mol % of terephthalic residue (10 wt %) were mixed, to which was added 0.05 wt % of silicon dioxide based on the total weight of the mixture.

Then the sample was longitudinally stretched at 78° C. (the orientation conditions are shown in Table 2), and after heated to 120° C., transversely stretched. After orientation was completed, the sample was cooled to 60%, maintaining 20% of further stretching, and further subjected to 5% of relaxation process, cooled and webbed. The resulting film was oriented film of 30 μm thick and both sides of the film was subjected to corona discharge treatment, and formed into tubular shape by using polyurethane-type adhesive admixed with hardening agent.

Example 3

Polyester copolymer composed of acid component, i.e. terephthalic acid/isophthalic acid (90/10 mol %) and alcohol component, i.e. ethylene glycol/cyclohexane dimethanol (50/50%) was polymerized to give the product having intrinsic viscosity of 0.70 dl/g, which was then melt-extruded at 280° C. and formed into unoriented film having thickness of 178 μm. Then the resulting film was oriented 1.3 times in longitudinal axis at 85° C., then 4.5 times in transverse direction at 110° C. Further, the film was oriented 4.5 times at 50° C. to form film. The resulting film was an oriented film having thickness of 30 μm and having properties shown in the following Table 3.

Example 4

Polyester copolymer composed of acid component (terephthalic acid/isophthalic acid/orthophthalic acid=85/10/5 (mol %)) and glycol component (ethylene glycol/diethylene glycol=80/20 (mol %)) was used to form unoriented film in the same manner as described in Example 1.

Then, the resulting film was oriented 1.8 times in longitudinal axis at 85° C., followed by 4.0 times in transverse axis at 150° C. Subsequently, the film was oriented in transverse direction at 65° C. (50%), while relaxed in longitudinal direction (30%), then cooled. The resulting film was a very preferred film having thickness of 35 μm, showing high thermo-shrinking ratio in transverse axis while showing quite low thermo-shrinking ratio in longitudinal axis. The properties of the above film are shown in Table 3.

TABLE 2

| Properties | Example 2 (A) | Example 2 (B) | Reference Example 4 | Reference Example 5 |
|---|---|---|---|---|
| Longitudinal Stretching Ratio (times) | 1.5 | 1.8 | 2.5 | 3.5 |
| Transverse Stretching Ratio (times) | 5.1 | 4.6 | 4.6 | 4.2 |
| Haze (%) | 2.9 | 3.3 | 3.1 | 2.6 |
| Thermal Shrinkage | | | | |
| longitudinal, at 80° C. (%) | 1.2 | 4.8 | 11.6 | 15.3 |
| transverse, at 80° C. (%) | 57 | 61 | 63 | 67 |
| longitudinal, at 100° C. (%) | 4.0 | 6.7 | 15.7 | 28.1 |
| transverse, at 100° C. (%) | 78 | 82 | 79 | 87 |
| Temperature at which sample showed minimal thermal shrinkage (°C.) | 83 | 81 | 52 | 53 |
| Birefringence | $99 \times 10^{-3}$ | $94 \times 10^{-3}$ | $31 \times 10^{-3}$ | $7 \times 10^{-3}$ |
| Surface Orientation Factor | $46 \times 10^{-3}$ | $62 \times 10^{-3}$ | $106 \times 10^{-3}$ | $121 \times 10^{-3}$ |
| Thermo-shrinkable Stress | | | | |
| transverse, at 80° C. (kg/mm$^2$) | 1.65 | 1.60 | 1.50 | 1.26 |
| transverse, at 100° C. (kg/mm$^2$) | 2.0 | 1.96 | 1.47 | 1.19 |
| Impact Strength (kg-cm) | 16.8 | 10.2 | 24.2 | 26.5 |
| Impact Strength After Retort Treatment at 125° C. for 30 min. (kg-cm) | 11.3 | 17.9 | 22.1 | 24.8 |
| Impact Resistance of the Bag against dropping | Good | Good | Excellent | Excellent |

The longitudinal orientation of the films of the Reference Examples 4 and 5 are 2.5 and 3.5 times respectively. However, these films had different temperature range showing high longitudinal shrinking ratio and sufficient shrinkage in the main axis, from the temperature range showing minimal thermal shrinkage in the perpendicular axis to the main axis (transversely), and in the latter case, the film showed the thermal shrinkage over 15% and the appearance of the finished product after the test was, as in Example 1, significantly bad.

TABLE 3

| Properties | Example 3 | Example 4 |
|---|---|---|
| Haze (%) | 2.9 | 2.8 |
| Thermal Shrinkage | | |
| longitudinal, at 80° C. (%) | 2.8 | −1.2 |
| transverse, at 80° C. (%) | 45 | 63 |
| longitudinal, at 100° C. (%) | 5.1 | 2.1 |
| transverse, at 100° C. (%) | 66 | 78 |
| Temperature at which sample showed minimal thermal shrinkage (°C.) | 91 | 84 |
| Birefringence | $95 \times 10^{-3}$ | $116 \times 10^{-3}$ |

TABLE 3-continued

| Properties | Example 3 | Example 4 |
|---|---|---|
| Surface Orientation Factor | 53 × 10$^{-3}$ | 35 × 10$^{-3}$ |
| Thermo-shrinkable Stress | | |
| transverse, at 80° C. (kg/mm$^2$) | 1.95 | 2.43 |
| transverse, at 100° C. (kg/mm$^2$) | 2.20 | 2.65 |
| Impact Strength (kg-cm) | 18.6 | 17.5 |
| Change in dimension upon longitudinal shrinkage after thermo-shrinking packaging | 4 | 0.6 |
| Impact Strength After Retort Treatment at 125° C. for 30 min. (kg-cm) | 15.9 | 14.8 |
| Impact Resistnace of the Bag against dropping | Good | Good |

*Longitudinal shrinkage after thermo-shrinking packaging was determined by preparing tube (length: 112 mm), putting the tube on a glass bottle and the film was subjected to thermo-shrinkage and the error in longitudinal axis (difference between maximal and minimal length) was defined.

The various properties of the tubes of the Examples are hereinafter illustrated, which were determined as follows:

(1) Thermal shrinkage

Thermal shrinkage was determined in the same manner as described above.

(2) Bottle-cracking Test

Single service bottle (300 ml) was used to be enclosed in a tube with its shoulder to be covered, and the tube was subjected to thermo-shrinking to be tightly adhered the bottle. After thermo-shrinking packaging, the bottle was filled with water and dropped from the height of 75 cm and tested according to the procedure of JIS Standard.

(3) Peripheral orientation factor and average surface orientation factor of the tube Refractive index in three directions were determined on JIS Abbe refractometer using the following equations:

$Birefringence = Ny - Nx$ (in peripheral direction of the tube)

$Ao$ (Mean Surface Orientation factor) $= \frac{Nx + Ny}{2} - Nz$ wherein Nx is refractive index in longitudinal direction or direction having little shrinkage of the tube; Ny is refractive index in peripheral direction or main shrinkage direction of the tube and N$_z$ is refractive index in thickness in the cylindrical tube film.

Example 5

Polyester type polymer composed of polyethylene (tere/iso)phthalate copolymer (tere/iso = 80/20) was polymerized to give the product having intrinsic viscosity of 0.75 dl/g, which was mixed with 0.05 (wt) % of silicon dioxide and melt-extruded to give an unoriented film.

The film was oriented 4.2 times mainly in transverse axis and cooled under about 12% of stretching to produce thermo-shrinking polyester film having birefringence of 101 × 10$^{-3}$ and surface orientation coefficient of 24 × 10$^{-3}$, peripheral thermal shrinkage of 50% at 80° C., thermal shrinkage of 70% at 100° C. and thickness s of 40 μm. The film was printed in the width of 720 mm and after printing it was cut into strips of 230 mm width. The cut film was applied to tube-forming machine and dichloroethylene (sp=9.87) was applied onto the surface of the film and films were laminated (before the covered surface was dried) to give a tube. The processing rate was 100 m/min. The results are shown in FIG. 1.

Reference Example 6

In comparison with the film of the present invention, the copolymer used in the present invention was used to be oriented (1.8, longitudinal; 4.4, transverse), followed by heat-treatment at 150° C. to produce a thermo-shrinkable polyester film having birefringence of 96 × 10$^{-3}$ and surface orientation factor of 106 × 10$^{-3}$, peripheral thermo-shrinking ratio of 25% at 80° C. and 32% at 100° C. and thickness of 40 μm. The resulting film was used to form tube in the same manner as described above.

Example 6

The thermo-shrinking film obtained in Example 5 was evaluated on its utility. As a result, the useful tube has thermal shrinkage not less than 30% at 80° C. and not less than 50% at 100° C., with minimal longitudinal thermal shrinkage at 80°±25° C. The solvent used herein was a mixed solvent of methylene chloride and dioxane (1:1).

Reference Example 7

Various conditions shown in Example 6 were changed to produce samples which are not included in the scope of the present invention and the properties determined are shown in Table 4.

Example 7 and Reference Example 8

In the same manner as described in Example 5, except that different surface orientation factor was employed, properties of tubes were evaluated. The results are shown in Table 5.

Example 8

Copolymer of poly(ethylene terephthalate/cyclohexanedimethyl terephthalate) (70/30) was used to produce a tube having peripheral thermo-shrinking ratio of 38% at 80° C. and 55% at 100° C. with minimal longitudinal thermal shrinkage of −0.2% at 88° C. The tube having birefringence of 109 × 10$^{-3}$ (peripheral) and orientation factor of 69 × 10$^{-3}$ (surface) was adhered by using dioxolane (sp=10.5). The resulting tube shows excellent properties as shown in Table 6.

Reference Example 9

The tube was obtained by ultrasonic seal of the film obtained in Example 5, which was statistically adhered closely.

Reference Examples 10 and 11

The same film as described in Example 5 was used. And the following solvent was used in the respective Reference Example:

Reference Example 10: ethylene dibromide (sp=7.84)

Reference Example 11: isopropyl ether (sp=7.3)

The samples of Reference Examples 9, 10 and 11 were evaluated and the results are shown in Table 6.

TABLE 4

| Properties | Example 5 | Example 6 No. 1 | Example 6 No. 2 | Example 6 No. 3 | Reference Example 7 |
|---|---|---|---|---|---|
| Adhesion Strength | Strong | Strong | Strong | Strong | Strong |
| Thermal shrinkage of tube (peripheral, at 80° C.) | 50% | 30% | 67% | 40% | 25% |
| Thermal shrinkage of tube (peripheral, at 100° C.) | 70% | 50% | 75% | 60% | 40% |
| Thermal shrinkage of tube (longitudinal at 80° C.) | −1.5% | 3.5% | −2.8% | −0.8% | 10.8% |
| Temperature at which the tube shows minimal thermal shrinkage | 75° C. | 93° C. | 70° C. | 82° C. | 110° C. |
| Adhering Strength after thermal shrinkage | Strong | Strong | Strong | Strong | Slightly Weak |
| Appearance of the joint after thermal shrinkage | Uniformly Shrunk | Uniformly Shrunk | Uniformly Shrunk | Uniformly Shrunk | Partly detached |
| Shrinkage at the joint | Same as base material | Same as base material | Same as base material | Same as base material | Partly Twitched |
| Peripheral Birefringence of Tube | $101 \times 10^{-3}$ | $86 \times 10^{-3}$ | $103 \times 10^{-3}$ | $98 \times 10^{-3}$ | $72 \times 10^{-3}$ |
| Surface Orientation Factor | $24 \times 10^{-3}$ | $48 \times 10^{-3}$ | $22 \times 10^{-3}$ | $30 \times 10^{-3}$ | $103 \times 10^{-3}$ |
| Bonded portion after boiling at 95° C. | Not Changed | Not Changed | Not Changed | Not Changed | Partly Whitened |
| Bonded portion after retort treatment at 125° C. for 30 min. | No cracking of film was observed | | | | |
| Appearance of the product after shrinking packaging process | Tightly fitted No uneven shrinking mottle was observed upon longitudinal shrinkage about 1.1 mm | | | | Unevenly shrunk in longitudinal (7.1 mm) |
| Bottle Breaking Test | 27 cm | 32 cm | 24 cm | 29 cm | 58 cm |
| Broken protion when bottle was cracked | | Other than joint | | | Three Bonded Portions |

TABLE 5

| Properties | Example 7 No. 1 | No. 2 | No. 3 | No. 4 | Reference Example 8 |
|---|---|---|---|---|---|
| Adhesion Strength | Strong | Strong | Strong | Sufficiently Strong | Strong |
| Adhesion Strength after Thermo-shrinkage | Strong | Strong | Strong | Sufficiently Strong | Slightly Weak |
| Shrinkage at bonded portion | Same as base material | Same as base material | Same as base material | Same as base material | — |
| Peripheral Birefringence of Tube | $77 \times 10^{-3}$ | $99 \times 10^{-3}$ | $107 \times 10^{-3}$ | $110 \times 10^{-3}$ | $79 \times 10^{-3}$ |
| Surface Orientation Factor | $28 \times 10^{-3}$ | $45 \times 10^{-3}$ | $73 \times 10^{-3}$ | $98 \times 10^{-3}$ | $110 \times 10^{-3}$ |
| Bonded portion after boiling at 95° C. | Not Changed | Not Changed | Not Changed | Not Changed | — |
| Bonded portion after retort treatment at 125° C. for 30 min. | Not Changed | Not Changed | Not Changed | Not Changed | — |
| Bottle Breaking Test | 21 cm | 23 cm | 27 cm | 41 cm | — |
| Broken portion when the bottle was cracked | | Other than bonded portions | | | — |

TABLE 6

| Properties | Example 8 | Reference Example 9 | Reference Example 10 | Reference Example 11 |
|---|---|---|---|---|
| Adhesion strength | Strong | Strong | Weakly adhered | Not adhered |
| Adhesion strength after thermo-shrinkage | Strong | Strong but fragile | Adhered but detachable upon tensile strength | — |
| Shrinkage at bonded portion | Like base material | Unevenly shrunk | Good appearance | — |
| Bonded portion after boiling at 95° C. | | Not changed | | — |
| Bonded portion after retort treatment at 125° C. for 30 min. | Not changed | Film was cracked | Bonded portion was detached | — |
| Finished product after shrunk packing process | Fit closely | Same as Example 1 | Same as Example 1 with bad bonded portion | — |
| Bottle braking test | 39 cm | 98 cm | 88 cm | — |
| Broken protion | Other than bonded portion | 85% of broken portion was | Bonded portion was detached | — |

TABLE 6-continued

| Properties | Example 8 | Reference Example 9 | Reference Example 10 | Reference Example 11 |
|---|---|---|---|---|
| | | bonded portion | | |

Thus from the film having birefringence less than $100 \times 10^{-3}$, the tube with remarkably excellent joint was obtained. And it also be found that the film can not be bonded with coefficient over the above value. And thus bonded portion is resistant to boiling and retort treatment. And since the film is bonded without adhesive, the possible thickening of the joint can be prevented. Therefore, the resulting tube can be well wound up without deviated winding and deforming the flatness of the foldable tube when the tube is continuously wound up to paper tube, reel or the like.

Example 9

Polyester type polymer of polyethylene(tere/iso) phthalate copolymer (tere/iso=80/20) was polymerized to intrinsic viscosity of 0.75 dl/g, mixed with 0.05 wt % of silicon dioxide, melt-extruded to produce an unoriented film.

The said film was oriented mainly in transverse axis to give a thermo-shrinkable polyester film with birefringence of $104 \times 10^{-3}$, thickness of 40 μm. The said film was used to be printed with the width of 720 mm and after printing it was cut into strips of 230 mm wide. The said film strips were applied to a device for tube forming machine, methylene chloride was spread over the film and the said films were immediately (before dried) laminated and processed into tube. The resulting tube had peripheral thermal shrinkage of 55% at 80° C., and 73% at 100° C.; peripheral birefringence of $104 \times 10^{-3}$; surface orientation factor of $25 \times 10^{-3}$.

The longitudinal thermal shrinkage was minimal value of 4% at 85° C. The single service bottle covered with the tube, and the said tube was thermo-shrunk at 100° C. for 5 seconds, and subjected to sterilization at 110° C. for 30 minutes.

Adhesive test of the tube was carried out by applying generally used adhesive for dry laminate (manufactured by Toyo Morton Co. Inc.) to the film of the present invention (Reference Example 12). Further, in the same manner, tests were performed using vinyl chloride (Reference Example 13) and polystyrene (Reference Example 14).

TABLE 7

| Properties | Example 9 | Reference Example 12 | Reference Example 13 (PVC) | Reference Example 14 (OPS) |
|---|---|---|---|---|
| Adhesion strength | Strong | Detached | Bad | Detached |
| Appearance at bonded portion | linear and neat | Bad | Bad with deformation | Bad |
| Adhesion strength after thermo shrinkage | Strong | *1 Weak | Partly detached | *2 |
| Bonded portion after thermo-shrinkage | Not changed | Produced deviation and got cloudy | Produced wrinkle, detachment and twitched portions | *2 |
| Thermo-shrinkage at bondd portion | Same as base material | Deviated shrinkage | Deviated shrinkage | *2 |
| Bonded portion after boiling at 95° C. | Not detached | Produced detached portion | Film was torn off | *2 |
| Bonded protion after retort treatment at 125° C. for 30 min. | Not detached | Detached | Film was torn off | *2 |
| Drop test (scattered distance) | 25 cm | 48 cm | 53 cm | *2 |

*1: The film was not adhered immediately, therefore the sample bonded by hand-coating, heated at 80° C. under pressure and allowed to stand for 24 hours was used for evaluation. The latter five article of properties were evaluated using the same tube treated as described above.
*2: The detachment could not be evaluated.

As is obvious from Table 7, in the tube obtained according to the process of the present invention, no changes were observed in appearance under ambient conditions and strength, and they retained the same properties as those of the base material portion and integrally bonded without change upon heat history.

Example 10

Polyester-type polymer which comprises acid component consisting of terephthalic acid, isophthalic acid and orthophthalic acid (80:15:5) and alcohol component consisting of ethylene glycol and diethylene glycol (70:30) was oriented in the same manner as described in Example 9 to give birefringence of $98 \times 10^{-3}$. The resulting film with the thickness of 30 μm was cut into strips with 720 mm wide and printed.

After printing, the strips were further cut into 230 mm width and the blank portion was coated with thin ethane dichloride at the rate of 60 m/min., immediately followed by bonding (before the film was dried). The film was wound onto wind-up roll immediately after bonding, without detachment at bonded portion. The resulting tube had peripheral thermal shrinkage of 48% at 80° C. and 65% at 100° C.; peripheral birefringence of $98 \times 10^{-3}$; and the longitudinal thermal shrinkage of the said tube was minimal, 5.3% at 87° C. In comparison, the ultrasonic sealed tube (Reference Example 15) was processed at low speed of 10 m/min. The resulting tube had properties as shown in the following Table 8.

TABLE 8

| Properties | Example 10 | Example 15 |
|---|---|---|
| Adhesion strength | Strong | Strong |
| Appearance at bonded | Straight and | Straight and |

TABLE 8-continued

| Properties | Example 10 | Example 15 |
| --- | --- | --- |
| portion | neat | neat |
| Adhesion strength after thermo-shrinkage | Strong | Strong |
| Impact resistance at bonded portion after thermo-shrinkage | Same as film | Fragile |
| Thermo-shrinkage at bonded portion | Same as base material | Deviatedly shrunk with partly detached portions |
| Drop test (scattered distance) | 22 cm | 68 cm |

Reference Experiment

The product was examined on the stability of printed pitch and the following results were obtained. The pitch of the printed product was determined with printing matrix of 115 μm long. In Reference Example 16, cross-linked polyethylene was used.

TABLE 9

| Properties | Example 9 | Reference Example 13 | Reference Example 14 | Reference Example 16 |
| --- | --- | --- | --- | --- |
| Immediately after printing | 114.95 | 114.75 | 114.85 | 114.31 |
| After 7 days (40° C., 65% RH) | 114.90 | 113.80 | 114.20 | 113.10 |
| After 1 month (40° C., 65% RH) | 114.90 | 113.25 | 114.10 | 112.50 |
| After 7 days (40° C., 80% RH) | 114.88 | 113.50 | 113.90 | 113.00 |
| After 1 month (40° C., 80% RH) | 114.82 | 113.05 | 113.71 | 112.40 |

As is shown in Table 9, the product of the present invention retains almost the same size as that of printing matrix for a long time.

That is a quite important property to fit the printing pattern to the material to be packed, whereby the printing pattern can be placed in the right position.

Example 11

Polyester-type polymer of polyethylene(tere/iso)phthalate copolymer (tere/iso=80/20) was polymerized to give intrinsic viscosity of 0.75 dl/g, mixed with 0.05 wt % of boron dioxide and melt-extruded to give an unoriented film.

The film was oriented mainly in transverse axis to produce thermo-shrinkable polyester film having binefringence of $104 \times 10^{-3}$ and thickness of 40 μm. The resulting film was printed in the width of 720 mm with blank portions with 7 mm wide with transverse pitch of 230 mm arranged along the longitudinal axis.

In another run, linear copolymerized polyester resin obtained by polycondensation of acid component (terephthalic acid:isophthalic acid:adipic acid =40:20:40 (mol %)) and glycol component (ethylene glycol:-neopentylglycol=60:40 (mol %)), which is hereinafter referred as polyester adhesive A, was dissolved in a mixed solvent of methyl ethyl ketone (1:4 by weight). Into the said solution was mixed the reaction product of trimethylol propane:trylene diisocyanate (1:3, by mole) (3 parts) and the mixture was coated onto one side of the blank film with 4.5 g/cm (solid), dried and slitted with 230 mm wide.

Separately, reaction product of trimethylol propane (1 mole) and trylene diisocyanate (3 mole) (5 parts) was mixed with methyl ethyl ketone to produce solvent which was coated onto the surface of the said slitted polyester film on which had been applied adhesive, and the film was folded in 230 mm width and bonded. The bonded film was immediately adhered and could be wound up without detachment, providing continuously tube with good appearance. The resulting tube had peripheral thermal shrinkage of 54% at 80° C. and 68% at 100° C.; birefringence of $104 \times 10^{-3}$, surface orientation coefficient of $24 \times 10^{-3}$. Longitudinal thermal shrinkage of the tube was minimal, 6.2% at 83° C. The tube was subjected to aging-treatment at 40° C. for 24 hours, then covered onto single service bottle, subjected to thermo-shrinkage at 100 ° C. for 5 seconds and to heat sterilization treatment at 110° C. for 30 minutes.

Adhesive test was performed applying generally used adhesive for dry-laminate (manufactured by Toyo Morton Co., Ltd) to the film of the present invention (Reference Example 16). Also, in the same manner, vinyl chloride (Reference Example 17) and polystyrene (Reference Example 18) were examined.

TABLE 10

| Properties | Example 11 | Reference Example 16 | Reference Example 17 (PVC) | Reference Example 18 (OPS) |
| --- | --- | --- | --- | --- |
| Adhesion strength | Strong | Detached | Bad | Detached |
| Appearance at bonded portion | Straight and neat | Bad | Bad with deformation | Bad |
| Adhesion strength after thermo-shrinkage | Strong | *1 Weak | Partly detached | *2 |
| Bonded portion after thermo-shrinkage | Not changed | Produced deviation and got cloudy | Produced wrinkle, detachment and twitched portions | *2 |
| Thermo-shrinkage at bonded portion | Same as base material | Deviated shrinkage | Deviated shrinkage | *2 |
| Bonded portion after boiling at 95° C. | Not detached | Produced portion | Film was torn off | *2 |
| Bonded portion after retort treatment at 125° C. for 30 min. | Not detached | Detached | Film was torn off | *2 |
| Drop test (scattered | 35 cm | 48 cm | 53 cm | *2 |

TABLE 10-continued

| Properties | Example 11 | Reference Example 16 | Reference Example 17 (PVC) | Reference Example 18 (OPS) |
|---|---|---|---|---|
| distance) | | | | |

*1: The film was not adhered immediately, therefore the sample bonded by hand-coating, heated at 80° C. under pressure and allowed to stand for 24 hours was used for evaluation. The latter five properties were evaluated using the same tube treated as described above.
*2: The detachment could not be evaluated.

As is obvious from Table 10, the tube of the present invention had the same properties as the base material and integrally bonded without any change in appearance and strength under ambient condition and further no change upon heat history.

Example 12

Polyester-type polymer consisting of acid component (terephthalic acid:isophthalic acid:orthophthalic acid=80:15:5) and alcohol component (ethylene glycol:diethylene glycol=70:30) was oriented in the same manner as Example 11 to give the birefringence of $98 \times 10^{-3}$. The resulting film with the width of 30 μm was printed after cut into strips with width of 720 mm. The strips were printed with transverse pitch of 230 mm and providing continuous blank portion with 7 mm wide arranged in longitudinal direction. Separately, urethane denatured polyester adhesive (30 wt %) and ethyl acetate (70 wt %) were mixed to give a mixture to which was further added adduct of trylene diisocyanate and trimethylol propane (2.5 wt %), and the resulting mixed solution was coated onto the said blank portion and dried. The coated amount after drying was 5 g/m². Subsequently, ethyl acetate was immediately applied onto the film and the said surface was bonded to the said adhesive-applied surface, resulting immediately adhesion to form tube. Then the tube was subjected to aging-treatment at 40° C. for 24 hours. The resulting tube had peripheral thermal shrinkage of 49% at 80° C. and 64% at 100° C.; birefringence of $98 \times 10^{-3}$. The resulting tube had minimal longitudinal thermal shrinkage of 6.7% at 91° C.

TABLE 11

| Properties | Example 12 | Reference Example 19 |
|---|---|---|
| Adhesion strength | Strong | Strong |
| Appearance at bonded portion | Straight and neat | Straight and neat |
| Adhesion strength after thermo-shrinkage | Strong | Strong |
| Impact resistance at bonded portion after thermo-shrinkage | Same as film | Fragile |
| Thermo-shrinkage at bonded portion | Same as base material | Fluctuately shrunk with partly detached portions |
| Drop test (scattered distance) | 25 cm | 68 cm |

Advantage of the Invention

The film of the present invention had stable thermo-shrinkable properties in a certain direction and can provide neat and strong packaging for covering and binding package. And the present film shows excellent properties for application in various fields, showing various advantages such as stability of printing pitch, improved heat-resistance, improved impact resistance and the like.

The tube of the present invention also had the same advantages as the film of the present invention as described above, and the process for preparing the tube provides high adhesion strength at joint, good processing speed, good productivity and tubular product having excellent shape-stability.

Further, another process for preparing tube of the present invention, wherein films are bonded by applying a solvent or swelling agent which can dissolve, softened or swell the adhesive layer onto one side of the film, the solvent and the like dissolve and soften only out side surface of the adhesive layer, therefore the initial tackiness and adhesive strength are rapidly enhanced after bonding to provide a rapid adhesion. That is, ultrasonic seal and conventional adhesion process can provide the bonding process speed of 5-15 m/min. and 0.1-1 m/min., respectively, while the above process of the present invention provide process at 60 m/min, as shown in above Examples, and moreover process several hundreds m/min. can be attained.

What is claimed is:

1. A thermo-shrinkable polyester type film which is obtained from a material selected from the group consisting of a polyester having a glass transition temperature of no less than 35° C., a polyester copolymer having a glass transition temperature of no less than 35° C., and a mixture of both of said polyester and polyester copolymer with at least one other polymer, wherein said film has the following shrinking properties:
   a shrinking ratio in the one axis is not less than 30% of 80° C. and not less than 50% at 100° C., and
   a shrinking ratio in perpendicular axis to the former axis is not more than 15% in the range of 55°–105° C., and the minimum value of the shrinking ratio occurs at a temperature in the range of 55°–105° C.; and
   having an orientation factor of not more than $100 \times 10^{-3}$.

2. A thermo-shrinkable polyester type film according to claim 1, which is made of a polyester copolymer or the mixture thereof, wherein the polyester copolymer mainly contains an ester group of a dicarboxylic residue and a glycol residue, and contains one kind of an aromatic dicarboxylic residue in an amount of 30–90 mole % based on the total dicarboxylic residue.

3. A thermo-shrinkable polyester type film according to claim 1, which has the maximum thermo-shrink stress at 80° C. of 0.95–5 kg/mm², and the maximum thermo-shrink stress at 100° C. of 1.0–5 kg/mm².

4. A tube of a thermo-shrinkable polyester type film which has a jointed surface being jointed by at least one solvent or swelling agent having a solubility or swelling ability to a polyester and a solubility index of 8.0–13.8, and the following shrinking properties:
   a peripheral shrinking ratio is not less than 30% at 80° C. and not less than 50% at 100° C., and
   a longitudinal shrinking ratio is not more than 15% in the range of 55°–105° C., and the minimum value of the shrinking ratio occurs at a temperature in the range of 55° to 105° C.

5. A tube of a thermo-shrinkable polyester type film according to claim 4, which is obtained from a material selected from the group consisting of a polyester having a glass transition temperature of not less than 35° C., a polyester copolymer having a glass transition temperature of not less than 35° C., and the mixture of both of said polyester and polyester copolymer with at least one other polymer, and has an orientation factor of not more than $100 \times 10^{-3}$.

6. A tube of thermo-shrinkable polyester type film according to claim 4, which is made of a polyester copolymer or the mixture thereof, wherein the polyester copolymer mainly contains an ester group composed of a dicarboxylic residue and a glycol reside, and contains one kind of an aromatic dicarboxylic residue in an amount of 30-90 mole % based on the total dicarboxylic residue, and has an orientation factor of not more than $100 \times 10^{-3}$.

7. A tube of thermo-shrinkable polyester type film according to claim 4, wherein the jointed surface is jointed by means of simply superposing one side of the film onto the another surface, applying a tape onto at least one surface of the film to joint the film, or butt-seam wherein resulting sealed portion is bent and adhered onto either surface of the tube.

8. A tube of thermo-shrinkable polyester type film according to claim 4, wherein the tube is jointed by at least one solvent or swelling agent having solubility Parameter of 8.0-13.8 selected from the group consisting of aromatic hydrocarbon, halogenated hydrocarbon, halogenated aromatic hydrocarbon, phenols, alcohols, nitrogen compound, ketones, ethers, esters, organic acids, inorganic acids, sulfur derivative and N',N'-dimethyl formamide.

9. A process for production of a tube from polyester type film which comprises:

disposing a polyester type film having shrinking properties wherein a shrinking ratio in one axis is not less than 30% at 80° C. and not less than 50% at 100° C., and a shrinking ratio in a perpendicular axis to the former axis is not more than 15% in the range of 55°-105° C., and the minimum value of the shrinking ratio in the perpendicular axis occurs at a temperature in the range of 55°-105° C., spreading at least one jointed surface of the film with a solvent or a swelling agent having solubility or swelling ability to a polyester and a solubility parameter or 8.0-13.8, and jointing the surfaces to be jointed to give a tubular film before the solvent or swelling agent is dried.

10. A process according to claim 9, wherein the polyester type film is obtained from a material selected from the group consisting of a polyester having a glass transition temperature of not less than 35° C., a polyester copolymer having a glass transition temperature of not less than 35° C., and the mixture of both of said polyester and polyester copolymer with at least one other polymer, and has an orientation factor of not more than $100 \times 10^{-3}$.

11. A process according to claim 9, wherein the film is jointed by using a solvent or a swelling agent selected from the group consisting of halogenated hydrocarbon and ethers.

12. A process according to claim 9, wherein the film is jointed at a temperature of not higher than 70° C.

13. A process for production of a tube from polyester type film which comprises:

disposing a polyester type film having shrinking properties wherein a shrinking ratio in one axis is not less than 30% at 80° C. and not less than 50% at 100° C., and a shrinking ratio in a perpendicular axis to the former axis is not more than 15% in the range of 55°-105°C., and the minimum value of the shrinking ratio in the perpendicular axis occurs at a temperature in the range of 55°-105° C., disposing an adhesive layer on entire or part of at least one surface to be jointed, spreading at least one surface with a solvent or a swelling agent having a solubility or swelling ability to a polyester and a solubility parameter of 8.0-13.8, and jointing the surfaces to be jointed to give a tubular film before the solvent or swelling agent is dried.

14. A process according to claim 13, wherein the polyester type film is obtained from a material selected from the group consisting of a polyester having a glass transition temperature of not less than 35° C., a polyester copolymer having a glass transition temperature of not less than 35° C., and the mixture of both of said polyester and polyester copolymer with at least one other polymer, and has an orientation factor coefficient of surface orientation of not more than $100 \times 10^{-1}$.

* * * * *